G. W. SYLVESTER.
Coupling-Joints for Reapers.

No. 138,709.  Patented May 6, 1873.

Witnesses:
E. A. Bates.
J. Connolly

Inventor:
Geo. W. Sylvester
Chipman Hosmer & Co.
att'ys

UNITED STATES PATENT OFFICE.

GEORGE W. SYLVESTER, OF PLAINVIEW, MINNESOTA.

IMPROVEMENT IN COUPLING-JOINTS FOR REAPERS.

Specification forming part of Letters Patent No. 138,709, dated May 6, 1873; application filed October 26, 1872.

*To all whom it may concern:*

Be it known that I, GEORGE W. SYLVESTER, of Plainview, in the county of Wabashaw and State of Minnesota, have invented a new and valuable Improvement in Coupling-Joints for Reapers; and I do hereby declare that the following is a full, clear, and exact description of the construction and operation of the same, reference being had to the annexed drawing making a part of this specification and to the letters and figures of reference marked thereon.

Figure 1:
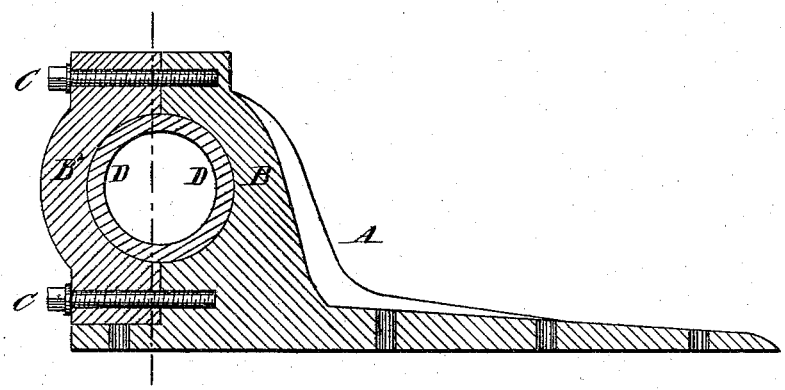
Figure 2:
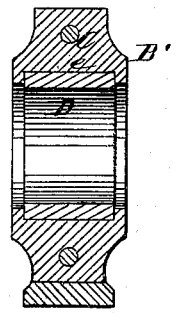

Figure 1 of the drawing is a representation of a longitudinal central section of my invention. Fig. 2 is a transverse section of the same.

This invention has relation to reaper-joints; and consists in the construction and novel arrangement of an internally-grooved adjustable eye in the joint between the connecting-rod and sickle-bar of a reaper or mower hereinafter described.

Referring to the drawing, A designates the reaper-joint to which my improvements appertain. B B' represent the two sections of the eye, secured together by means of set-screws C, and, therefore, adjustable to enable the rubber packing to be inserted and tightly clasped. The packing consists of two semi-cylindrical sections of hard rubber, marked D in the drawing, and fitting closely an annular groove formed inside the eye, as shown at *e*.

By having the packing thus inclosed its lateral expansion is entirely prevented. By having the eye adjustable the connecting rod or pitman may be made with a solid flange or head instead of being provided with a key or other like device for holding it in place. Sometimes a solid rubber ring may be used instead of two sections.

The improvements herein described may be applied to other machinery besides the working parts of reaping-machines.

The packing of rubber is confined in the groove or cavity of the eye, by adjusting which it is clasped tightly around the pitman.

What I claim as my invention, and desire to secure by Letters Patent, is—

The reaper-joint herein described, consisting of the adjustable internally-grooved eyes B B'; rubber packing D arranged within the grooves *e*, and the adjusting-screws C, the several parts being constructed as shown and specified.

In testimony that I claim the above I have hereunto subscribed my name in the presence of two witnesses.

GEORGE W. SYLVESTER.

Witnesses:
O. B. GOULD,
C. G. MAYBURY.